United States Patent
Hinz

(10) Patent No.: US 6,818,159 B2
(45) Date of Patent: Nov. 16, 2004

(54) PROCESS FOR THE PRODUCTION OF A COMPOSITE CONSISTING OF A FIBER REINFORCED MATERIAL

(75) Inventor: Bernhard Hinz, Filderstadt (DE)

(73) Assignee: Deutsches Zentrum fuer Luft-und Raumfahrt e.V., Bonn (DE)

( * ) Notice: Subject to any disclaimer, the term of this patent is extended or adjusted under 35 U.S.C. 154(b) by 528 days.

(21) Appl. No.: 09/782,612

(22) Filed: Feb. 13, 2001

(65) Prior Publication Data

US 2002/0020934 A1 Feb. 21, 2002

(30) Foreign Application Priority Data

Mar. 17, 2000 (DE) .......................................... 100 13 409
Feb. 8, 2001 (DE) ..................................... 201 02 569 U
Feb. 8, 2001 (EP) ........................................... 01102981

(51) Int. Cl.[7] ............................................. B29C 70/44
(52) U.S. Cl. ...................... 264/40.6; 264/102; 264/257; 264/258; 264/510; 264/511; 264/512
(58) Field of Search ................................ 264/102, 257, 264/258, 510, 521, 571, 406, 512

(56) References Cited

U.S. PATENT DOCUMENTS

| | | | | |
|---|---|---|---|---|
| 4,201,823 A | * | 5/1980 | Russell ........................ | 428/246 |
| H465 H | * | 5/1988 | Brown ......................... | 73/590 |
| 4,828,472 A | * | 5/1989 | Itoh et al. .................... | 425/143 |
| 4,902,215 A | | 2/1990 | Seemann, III | |
| 4,942,013 A | * | 7/1990 | Palmer et al. .............. | 264/511 |
| 5,052,906 A | | 10/1991 | Seemann | |
| 5,210,499 A | * | 5/1993 | Walsh ......................... | 324/649 |
| 5,256,366 A | * | 10/1993 | Wejrock et al. ............. | 264/510 |
| 5,403,537 A | | 4/1995 | Seal et al. | |
| 5,439,635 A | | 8/1995 | Seemann | |
| 5,528,155 A | * | 6/1996 | King et al. .................. | 324/713 |
| 5,601,852 A | | 2/1997 | Seemann | |
| 5,837,185 A | * | 11/1998 | Livesay et al. ............. | 264/511 |
| 5,849,229 A | * | 12/1998 | Holtzberg .................... | 264/102 |
| 5,885,513 A | * | 3/1999 | Louderback et al. ........ | 264/459 |
| 6,159,414 A | * | 12/2000 | Tunis, III et al. ........... | 264/510 |
| 6,406,659 B1 | * | 6/2002 | Lang et al. .................. | 264/510 |
| 2002/0020934 A1 | | 2/2002 | Hinz | |
| 2003/0011094 A1 | | 1/2003 | Filsinger et al. | |

FOREIGN PATENT DOCUMENTS

| | | |
|---|---|---|
| DE | 198 13 105 | 9/1999 |
| DE | 100 13 409 | 3/2000 |
| FR | 2 771 960 | * 6/1999 |
| GB | 1 441 919 | 7/1976 |
| WO | WO 94/20278 | 9/1994 |
| WO | WO 95/32849 | 12/1995 |

* cited by examiner

*Primary Examiner*—Stefan Staicovici
(74) *Attorney, Agent, or Firm*—Barry R. Lipsitz; Douglas M. McAllister

(57) ABSTRACT

In order to provide a process for the production of a component consisting of a fiber reinforced material, with which liquid resin is supplied to a semifinished fiber article by way of application by vacuum pressure, it is provided for a heat curing resin to be used as resin and for application by vacuum pressure and temperature to be controlled such that in relation to the liquid resin the boiling point curve of the resin is not exceeded.

42 Claims, 6 Drawing Sheets

Figure 1:
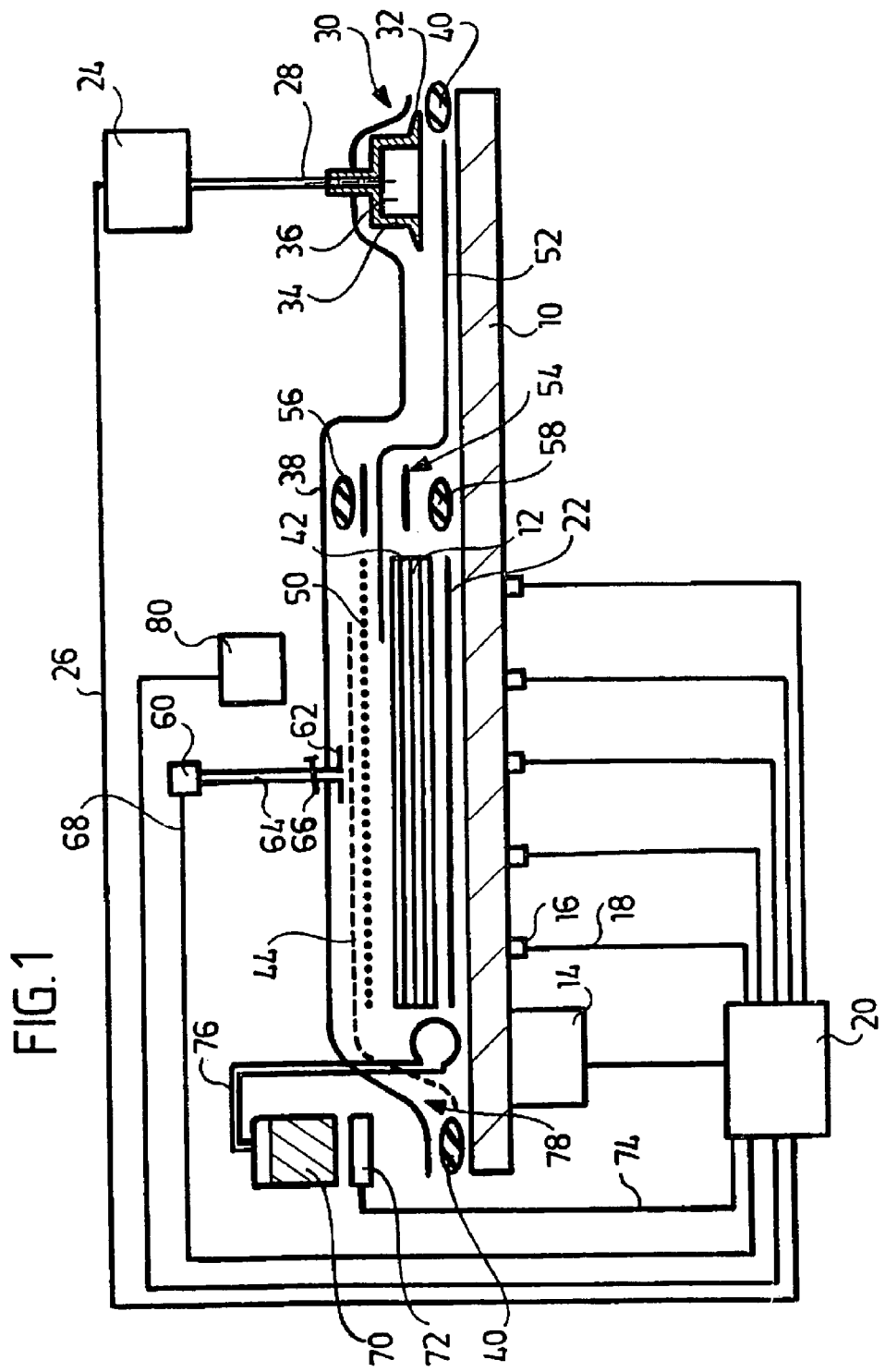

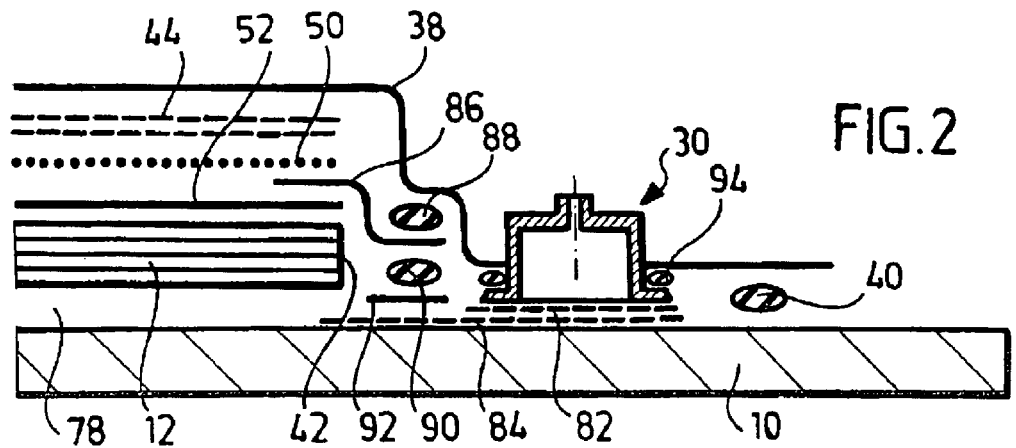
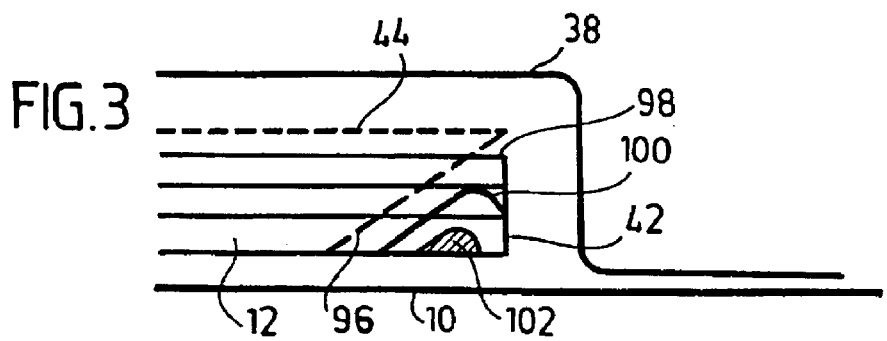
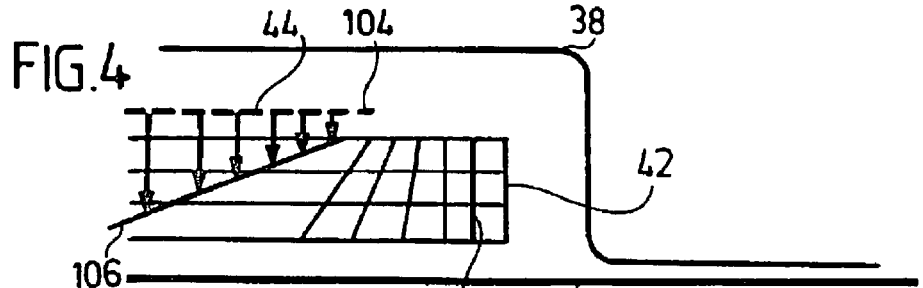
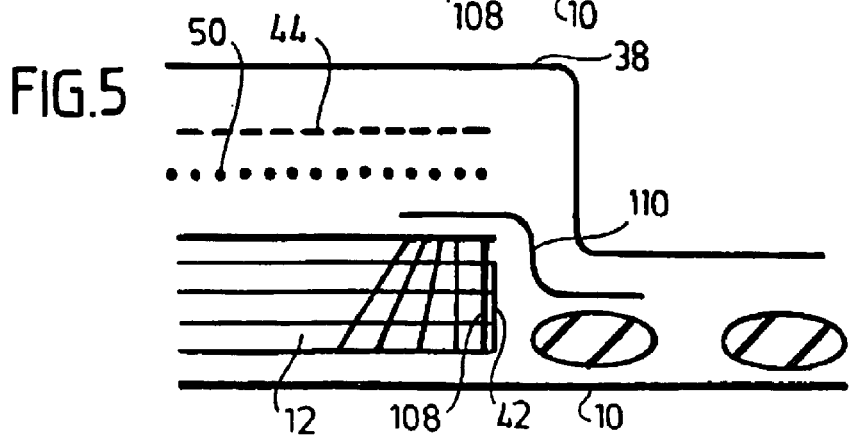

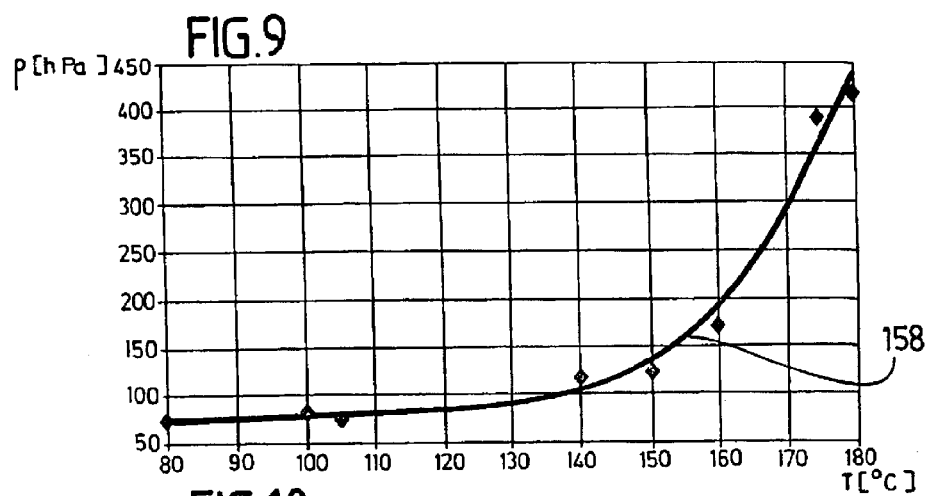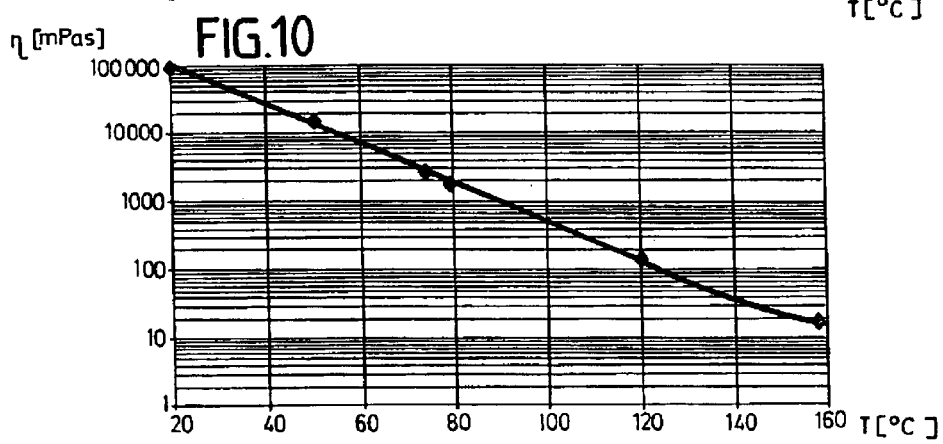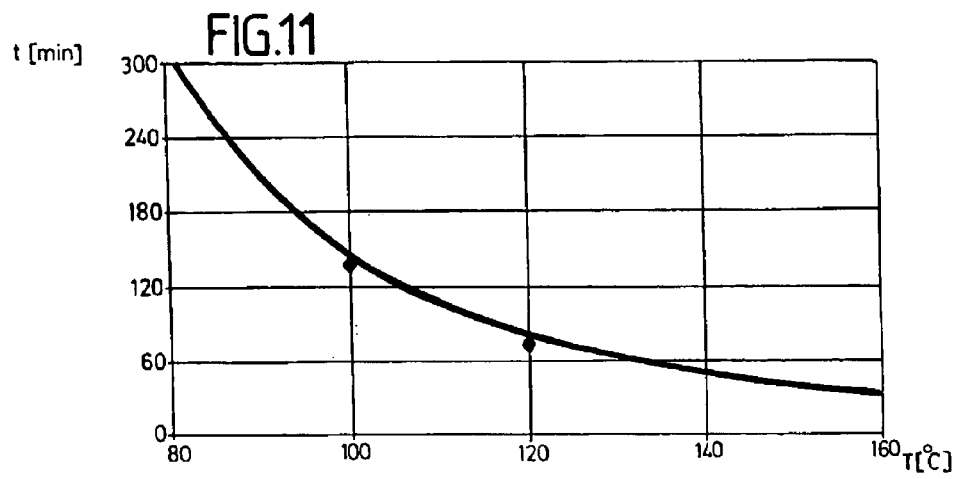

PROCESS FOR THE PRODUCTION OF A COMPOSITE CONSISTING OF A FIBER REINFORCED MATERIAL

The invention relates to a process for the production of a component consisting of a fiber reinforced material, with which liquid resin is supplied to a semifinished fiber article by way of application by vacuum pressure.

Such processes are known from the state of the art and are also designated as vacuum injection processes.

Vacuum injection processes are known, for example, from U.S. Pat. No. 4,902,215, U.S. Pat. No. 5,052,906, U.S. Pat. No. 5,601,852, U.S. Pat. No. 5,439,635 or WO 94/20278.

DE 100 13 409 C1 discloses a process for the production of fiber reinforced plastic components from dry semifinished fiber composites by means of an injection process for the injection of matrix material, with which a first chamber is formed by means of a membrane permeable to gas and impermeable to matrix material and a second chamber is formed which abuts on the first chamber which is separated from the surroundings by means of a film impermeable to gas and matrix material and wherein air is drawn off from the second chamber and, as a result, matrix material from a storage vessel is drawn into the evacuated first chamber.

The object underlying the invention is to provide a process of the type specified at the outset, by means of which components of a high quality can be produced and, in particular, components with large surface areas can also be produced.

This object is accomplished in accordance with the invention, with the process specified at the outset, in that a heat curing resin is used as resin and that application by vacuum pressure and temperature are controlled such that in relation to the liquid resin the boiling point curve of the resin is not exceeded.

In accordance with the invention, heat curing resins can also be used for the production of structural components by means of a vacuum injection process. For example, the heat curing resin system Hexcel RTM6 which is authorized for aviation can be used. As a result of the use of low viscosity resins a high fiber volume content in the component can be achieved and this is, for example, between 40% and 60%. The bulk of the component can be reduced due to the high fiber volume content.

On the other hand, heat curing resins normally have a relatively low boiling pressure and so the resin can boil during the heating up due to application by vacuum pressure. The gas bubbles thereby resulting can no longer be removed from the workpiece and thus have a negative effect on the quality of the workpiece. Due to the inventive control of the application by vacuum pressure and the temperature it is possible to avoid the boiling point curve being exceeded. In accordance with the invention, structural components which are practically free from bubbles can therefore be produced with a high degree of repetition.

A separation between the structure of the semifinished fiber article (laminate structure) and impregnation of the resin can be achieved, in particular. In accordance with the invention, structural components with large surface areas can also be produced by means of a vacuum injection process without an autoclave needing to be provided. The costs of manufacturing a component may thus be reduced considerably. For example, foam cores and inserts can also be integrated in one operating procedure.

The impregnation of the semifinished fiber article itself represents a complete process which takes place in a vacuum atmosphere, i.e. is separated from the outside environment. As a result, the workplace stress is low and, in particular, it is possible for no skin contact with resin to occur.

The production of the component may also be carried out in relation to known processes with less time expended. As a result, the costs are again reduced.

It is advantageous when the application by vacuum pressure is controlled via a vacuum pump during the resin infiltration. A pumping capacity of the vacuum pump, which then has a direct effect on the vacuum pressure applied to the workpiece, may be adjusted in a selective manner. Possible losses in pressure in connecting lines and the like can be determined in a simple manner or are known and so during the resin infiltration, during which the temperature of the injected resin and the temperature of the semifinished fiber article are adjusted in a defined manner, a specific vacuum can also be set in order to avoid the resin boiling.

In order to be able to supply the resin to the semifinished fiber article in a defined manner it is particularly favorable when a distribution fabric is provided which has vacuum pressure applied to it. Flow channels are formed in the distribution fabric which serves as a flow aid and a flow of resin is generated in these channels via a pressure gradient or capillary effect. As a result, the workpiece may be impregnated with resin in a selective manner, wherein the resin flow and, in particular, resin flow fronts can be controlled.

It is favorable when the pressure following the resin infiltration is measured at a distribution fabric which serves to supply resin to the semifinished fiber article. Since the distribution fabric normally has a high permeability and covers the entire workpiece, a take-up of pressure at the distribution fabric is particularly suitable for carrying out a pressure control.

In order to measure the pressure it is advantageous when one or several pressure sensors are brought into operative connection with the distribution fabric following the resin infiltration of the workpiece. The prevailing pressure may then be determined via these pressure sensors. In order to prevent resin passing into connecting lines to the pressure sensor or sensors during the infiltration of the workpiece with resin (impregnation), the operative connection is interrupted prior to and during the resin infiltration of the workpiece. In this phase, the pressure is, in particular, adjusted via the capacity of the vacuum pump in order to avoid any boiling of the resin accordingly. Following the resin infiltration, the operative connection is again established in that a line clamp is, for example, released. The pressure at the workpiece then prevails at the pressure sensor and the vacuum can be adjusted accordingly at a given temperature with the aid of the measurement value of the pressure sensor such that no gas bubbles are formed in the resin.

In order to produce certain structural components it may be provided for the semifinished fiber article to be placed in a mold during the resin infiltration. In this respect, it is sufficient to design the mold as a one-sided form, onto which the semifinished fiber article is placed. A vacuum chamber, in which a vacuum prevails, may then be established by means of a vacuum foil which is laid over the semifinished fiber article. No specially designed autoclave has to be provided for manufacturing the structural component and, in particular, components with large surface areas can also be produced.

In order to ensure a high quality of the component it is provided, in particular, for the temperature of the mold to be controlled. As a result, the temperature of the resin during the infiltration (impregnation) can, on the one hand, be controlled in order to avoid the occurrence of boiling bubbles. On the other hand, an optimum temperature may be set for the curing of the resin after the infiltration in order to again ensure a high quality of the component in this case, as well.

To monitor the temperature it may also be provided for a plurality of temperature sensors to be arranged at a vacuum foil. The vacuum foil is arranged above the workpiece so that a measurement of temperature is also made possible in this area.

It is particularly advantageous when the temperature is adjusted with respect to the temperature dependence of the viscosity of the resin. If the viscosity is too high there is the risk of resin, which saturates the semifinished fiber article, flowing out again. If, on the other hand, the viscosity is too low, the semifinished fiber article will not be sufficiently impregnated.

A resin infiltration favorably takes place in an injection phase at a certain temperature or in a certain temperature range, at which the resin has such a viscosity that an essentially uniform resin front can be formed. The resin front as flow front then passes uniformly through the semifinished fiber article and this is impregnated uniformly without any air and gas pockets being formed. As a result, a high quality of the component can again be achieved. In practice, it has proven to be favorable when the temperature is adjusted such that the viscosity of the resin is in the range between 10 mPas and 1000 mPas and, in particular, between 20 mPas and 500 mPas.

During the curing of injected resin, the temperature can be increased to aid the curing. On the other hand, exothermal resin systems such as Hexcel RTM6 are also known which cure exothermally. In order to avoid any boiling of the curing resin, it is therefore advantageous when a reduction in the application by vacuum pressure takes place in a curing phase which follows an injection phase. As a result, resin is also prevented from being withdrawn from the workpiece. Furthermore, the risk of the resin outgassing is also reduced as a result.

It is favorable for the defined curing and gelling of the resin when an increase in temperature takes place in the curing phase which follows the injection phase.

It is particularly advantageous when the temperature is increased in a curing phase, in which the resin is completely cured, in order to thus achieve the complete curing of the resin. The temperature is thereby increased in relation to an injection phase. It is favorable for the injection phase when the temperature is set to be relatively low in order to be able to set a high underpressure (good vacuum). In the curing phase, the semifinished fiber article is already saturated with resin and as the pressure can then be increased (vacuum can be reduced), an increase in temperature can also be carried out for the curing.

Furthermore, it is particularly advantageous when the temperature in the final curing phase is also increased in relation to a curing phase which follows an injection phase. In the final curing phase the resin is already cured to such an extent that boiling bubbles are no longer formed and so an increase in temperature is possible even without an additional reduction in pressure. The resin is reacted out completely due to the increase in temperature.

It is favorable from the point of view of manufacturing techniques when the temperature is adjusted such that a certain processing time or a certain processing period of time is specified for the resin. Apart from adjusting and monitoring pressure and temperature and, as a result, the viscosity, the processing period of time for the resin must also be taken into consideration as this gels, wherein the gelling time is, again, dependent on the temperature. If the temperature is selected to be too high, the resin will, in certain circumstances, gel too quickly without a uniform impregnation of the semifinished fiber article having, for example, been achieved. The processing period of time is adjustingly adapted to the size of the component.

In accordance with the invention, it is provided, in particular, for a process monitoring with respect to resin infiltration and resin curing to be carried out. As a result, a high quality of the component can be achieved in that, on the one hand, the occurrence of boiling bubbles during the resin infiltration and resin curing is avoided and, on the other hand, the drawing of resin out of the impregnated semifinished fiber article during the curing phase is avoided. The outgassing of resin during the curing phase may also be avoided. In addition, a defined resin curing can be carried out.

In a variation of one embodiment it is provided for the resin to be pre-aged prior to the infiltration in order to increase the viscosity. For this purpose, the resin is kept for a certain time at a certain temperature or in a certain range of temperatures. When this pre-aged (prereacted) resin is then supplied to the semifinished fiber article, it is less highly fluid and the problem of the resin "flowing through" the semifinished fiber article during the impregnation or the problem of the resin being drawn out of the impregnated semifinished fiber article is reduced.

A resin trap is favorably provided, by means of which a uniform application by vacuum pressure is made possible after the resin infiltration and which essentially prevents any removal of resin by suction during a curing phase of the resin. As a result of such a resin trap, the quality of the component can be ensured after the impregnation since no resin is drawn off and, on the other hand, the application by vacuum pressure still remains uniform.

The resin trap favorably comprises an extraction guide means which has such a large internal diameter that air and gas bubbles can rise without resin being pressed into an extraction chamber. As a result, vacuum pressure can be applied to the distribution fabric; on the one hand, the uniformity of the application of vacuum pressure to the workpiece is promoted and, on the other hand, resin is removed at the most from the distribution fabric but not from the workpiece. If the extraction guide means itself has vacuum pressure applied to it, the uniformity of the application of vacuum pressure to the workpiece can be aided as a result. For example, a storage vessel for resin may be used as extraction vessel following the infiltration in that a cover is closed in an air-tight manner. The vacuum pressure (underpressure) at the workpiece within a vacuum chamber is then likewise present in the extraction chamber in order to promote the uniformity of the application by vacuum pressure over the workpiece. On the other hand, the extraction guide means prevents the resin from being able to ascend into the extraction vessel. It is, therefore, favorable when the extraction chamber is formed in a storage vessel for resin for the resin injection.

In an advantageous variation of one embodiment, a distribution fabric which serves as a flow aid for the supply of resin to the semifinished fiber article is no longer operative after a certain-distance in relation to a workpiece edge. When resin passes into the semifinished fiber article from the distribution fabric and, in particular, passes in at right angles to laminate layers of the semifinished fiber article, a flow front is formed with a given angular course of the flow front. If the distribution fabric is still operative at the workpiece edge, oppositely directed flow fronts can form which can lead to air pockets which can influence the quality of the component. As a result of the fact that the semifinished fiber article is no longer operative after a certain distance in relation to a workpiece edge, the flow front angle can be increased and, in particular, it can, in the ideal case, be set vertically to layer surfaces of the laminate structure. As a result, no air pockets can occur.

In practice, it has proven to be favorable when the distance is in the range of between 10 mm and 50 mm and, in particular, between 25 mm to 35 mm. The distance set each time depends on the thickness of the component.

In a variation of one embodiment, the flow aid is made inoperative in the area at the workpiece edge in that the distribution fabric ends before the given distance so that the distribution fabric does not, therefore, end flush with the workpiece edge. The speed of the resin is then reduced considerably in the area without any distribution fabric which leads to an increase in the flow angle of the resin front.

In an alternative embodiment, a cover film is provided between workpiece and distribution film to limit the effectiveness of the distribution fabric, whereby the supply of resin to the semifinished article is again hindered and as a result the speed of the resin is again reduced; in this way, a steeper resin front can also be formed.

The problem of air pockets can also result at workpiece edges, at which laminate layers meet one another at an angle. The course of the resin front is bent at such an edge which can, again, lead to air pockets. In accordance with the invention, it is provided for the distribution fabric which serves as a flow aid during the supply of resin to be cut in relation to a workpiece edge in order to control the angular course of the flow front of the resin. By cutting the distribution fabric at the edge, a gap results between pieces of distribution fabric which are associated with the laminate layers which meet one another at an angle. The speed of the resin flow is then reduced again at the edge itself which leads to a steeper angle of the resin flow front, whereby the risk of air pockets is again avoided to a great extent.

In order to see to it that the resin does not flow around an edge with a steeper angular course of the flow front such that oppositely directed flow fronts can, for example, be formed, it is particularly advantageous when an edge end is sealed in order to prevent any flow around it.

It is particularly favorable when one or several vacuum ports are provided, via which the workpiece has vacuum pressure applied to it and which is or are connected to one or several vacuum pumps. The vacuum in a vacuum chamber which is limited, in particular, by a vacuum foil may be introduced via the vacuum port.

In this respect, one vacuum port is favorably arranged in an area which is reached by a flow front of the injected resin last. A complete impregnation can be ensured as a result.

The inventive process may be used inexpensively when one vacuum port is designed as a resin trap which can accommodate a certain amount of resin in order to prevent resin passing into a vacuum system. It may happen that resin will been drawn in by the vacuum port. Due to its design as a resin trap the vacuum system will not be soiled.

In a variation of one embodiment it is provided for the vacuum port to be connected via distribution fabric to an underside of the semifinished fiber article. The vacuum pressure is then applied to the semifinished fiber article, wherein it is possible, on the other hand, by means of corresponding seals to avoid resin being drawn in via the vacuum port from an upper side of the distribution fabric.

It is favorable when a connection of the vacuum port to a vacuum foil is sealed in order to be able to form a vacuum chamber.

Furthermore, it is favorable when the distribution fabric is sealed in relation to a workpiece edge so that resin cannot be drawn off upwards by means of the vacuum port. Furthermore, it is also favorable when a film is arranged between distribution fabric and seal and when the vacuum port is sealed in relation to the workpiece. The workpiece then has vacuum pressure applied to it essentially only via the distribution fabric which is connected to an underside of the semifinished fiber article. The possible penetration channels, via which resin can reach the vacuum port, are then minimized.

It is particularly favorable when a resin brake is arranged at a workpiece edge. In the case of low-viscous resin (highly fluid resin) there is the risk that resin will be injected into a semifinished fiber article but that this can partially flow out again or can be drawn off. This can be reduced or rather avoided by means of the resin brake as stop area for the flow of resin.

It is favorable when a first connection for the application by vacuum pressure is arranged in front of a resin brake in relation to the semifinished fiber article and a second connection is arranged behind a resin brake. The uniformity of the application by vacuum pressure may then be achieved during the resin infiltration via the first connection. The vacuum is maintained via the second connection even after the impregnation of the semifinished fiber article while the first connection is uncoupled (the application by vacuum pressure is stopped) when the resin front reaches it.

In a variation of one embodiment it is provided for a process monitoring to be carried out by means of ultrasound acting on the workpiece. This may be an on-line process monitoring, wherein the sound velocity and the attenuation in the workpiece, in particular, are determined. As a result, the degree of curing of the resin can, for example, be determined, and the quality of the workpiece can also be monitored.

A polyaddition resin, such as an epoxy resin or a bismaline resin, is used, for example, as heat curing resin.

Furthermore, it is favorable when the resin supply speed of resin from a resin store to the semifinished fiber article can be controlled in order to obtain a good impregnation of the semifinished fiber article with resin.

The object cited at the outset is solved, in addition, by an apparatus for carrying out the process which comprises at least one vacuum port for applying vacuum pressure to a workpiece, wherein the vacuum port is designed as a resin trap which can accommodate a certain amount of resin in order to prevent the resin from passing into a vacuum system which is connected to the vacuum port.

This apparatus has the advantages already explained in conjunction with the inventive process.

Additional, advantageous embodiments are the subject matter of the subclaims which follow the corresponding apparatus connection. Advantages of these embodiments have likewise already been explained in conjunction with the inventive process.

The object cited at the outset is accomplished, in addition, by an assembly for the production of a component consisting of a fiber reinforced material by means of resin impregnation of a semifinished fiber article which comprises:

a mold;

a vacuum foil, by means of which a vacuum chamber can be produced, in which the semifinished fiber article can be positioned on the mold, wherein vacuum pressure can be applied to the vacuum chamber and a device for supplying liquid resin to the semifinished fiber article, wherein, in accordance with the invention, application by vacuum pressure and temperature can be controlled during the resin impregnation such that in relation to the liquid resin the boiling point curve is not exceeded.

This assembly has the advantages already explained in conjunction with the inventive process and the inventive apparatus.

Additional, advantageous embodiments have already been explained in conjunction with the inventive process and the inventive apparatus.

Figure 6A:
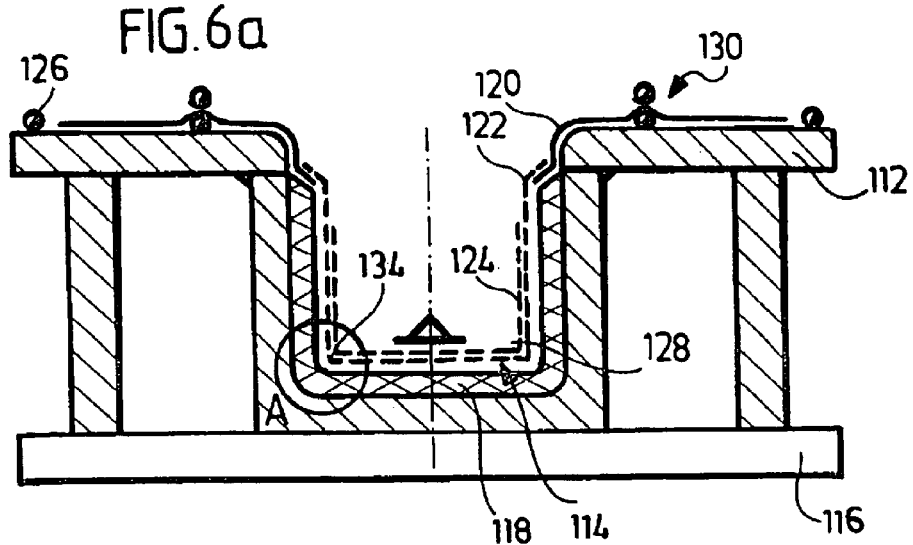
Figure 6B:
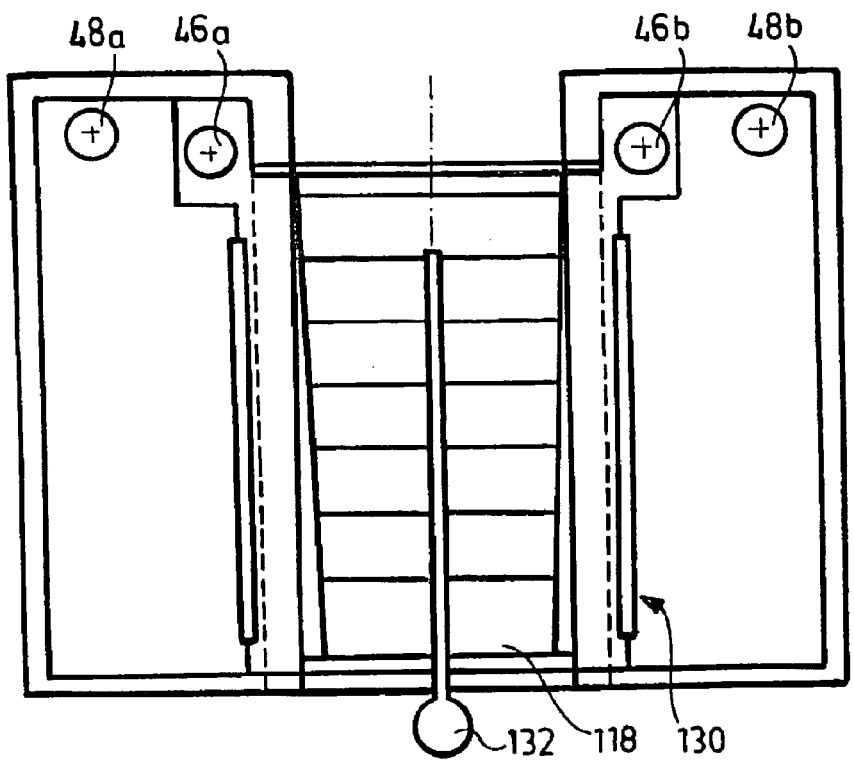
Figure 7:
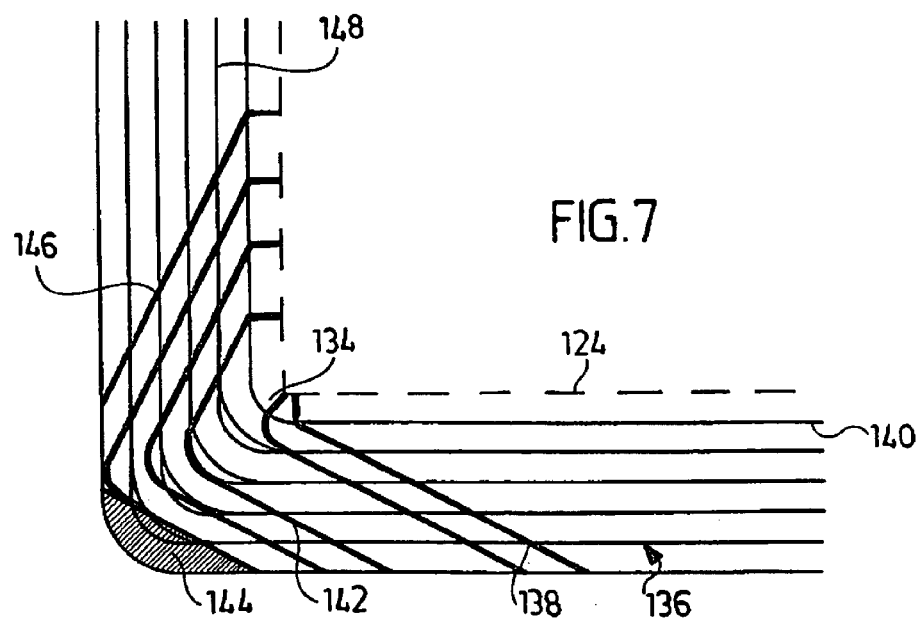
Figure 8:
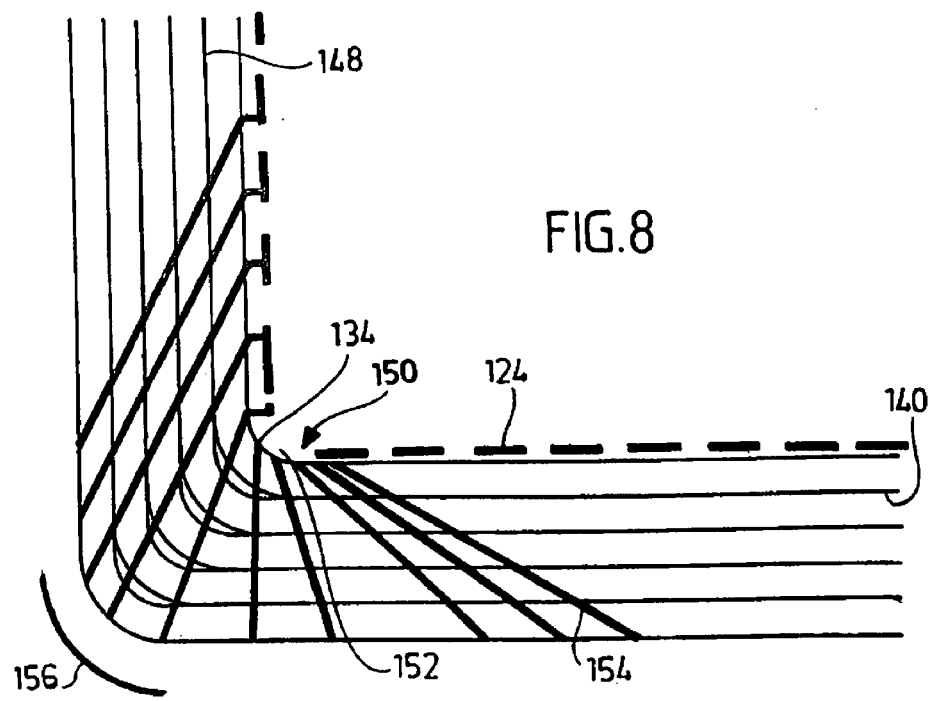

The following description of preferred embodiments serves to explain the invention in greater detail in conjunction with the drawings. These show:

FIG. 1 a schematic illustration of an assembly for carrying out the inventive process for the production of a workpiece consisting of a fiber reinforced material;

FIG. 2 a variation of an arrangement of a vacuum port;

FIG. 3 the course of a resin flow front at the edge of a workpiece in accordance with the state of the art;

FIG. 4 a first embodiment of an inventive assembly, with which the course of a resin flow front is adjusted in a selective manner;

FIG. 5 a second variation of an assembly for the selective adjustment of a given course of the resin front in the vicinity of an edge of the workpiece;

FIG. 6($a$) a schematic sectional view of an apparatus for the production of a workpiece consisting of a fiber reinforced material by means of vacuum injection;

FIG. 6($b$) a plan view of the apparatus according to FIG. 6($a$);

FIG. 7 the course of a resin flow front at an edge of the workpiece in accordance with the state of the art;

FIG. 8 an enlarged section from FIG. 6($a$), showing the course of a resin front when a distribution fabric is arranged and designed in accordance with the invention;

FIG. 9 the boiling point curve of the heat curing resin Hexcel RTM6;

FIG. 10 the temperature dependence of the dynamic viscosity of liquid Hexcel RTM6;

FIG. 11 the temperature dependence of the processing time t* of Hexcel RTM6 and

Figure 12:
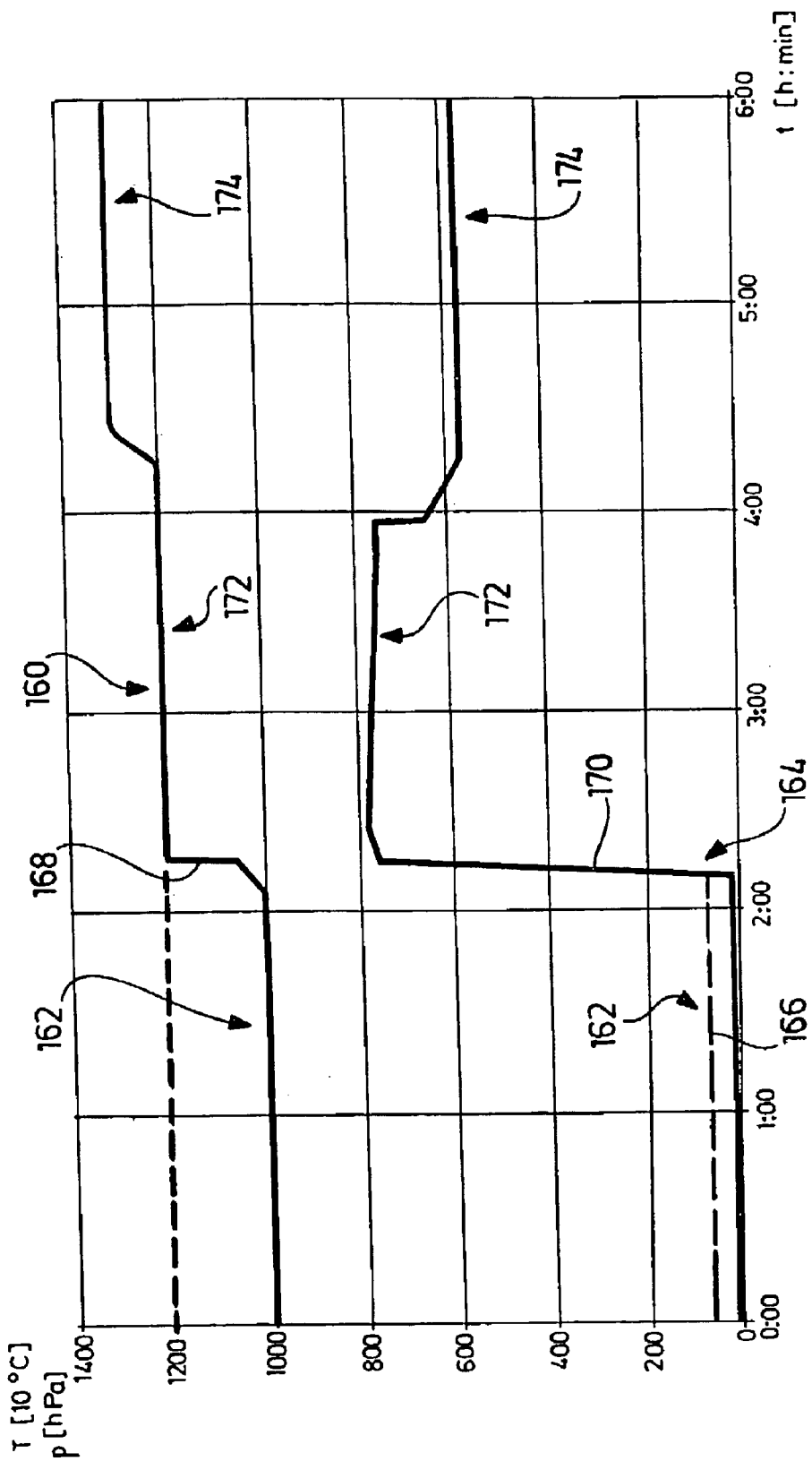

FIG. 12 a schematic course of pressure and temperature over the time in a production variation of a component.

In the case of the inventive process for the production of a component consisting of a fiber reinforced material, as illustrated schematically in FIG. 1 by means of one embodiment of an inventive assembly, a heatable mold 10 is provided, on which a semifinished fiber article 12 can be positioned. The mold 10 is preferably a one-sided form. The semifinished fiber article 12 has, in particular, a laminate structure.

The mold 10 can be heated via a heating device 14, namely, in particular, such that the temperature can be adjusted in a selective manner at least via the mold area, in which a component production takes place. In a variation of one embodiment the temperature of the mold 10 is monitored via a plurality of temperature sensors 16 which are each connected to a control and regulation device 20 via a measurement signal line 18 in order to supply a result of temperature measurement to this device.

A separating means 22, for example, in the form of a separating film is arranged between the semifinished fiber article 12 and the mold 10 in order to facilitate the release of a cured component from the mold 10.

Resin is supplied to the semifinished fiber article 12 by way of application by vacuum pressure (vacuum injection). For this purpose, a vacuum pump 24 is provided, the capacity of which can, in particular, be controlled in order to be able to set a given vacuum in a selective manner during the production of the component. The vacuum pump 24 is preferably connected via a control line 26 to the control and regulation device 20, via which the pumping capacity can be controlled. The vacuum pump 24 is connected, in addition, via a suction line 28 to a vacuum port 30 which has a flange 32 which is formed on a cup-shaped receiving element 34. The receiving element 34 may be placed in position by means of the flange 32, wherein a large contact surface is available and so any impression of the receiving element 34 can be avoided to a great extent and also the clamping of intermediate fabric layers, such as those of a distribution fabric or of a peel ply.

A receiving chamber 36 is formed in the receiving element 34 and this communicates with the vacuum pump 24 on one side and is open on the other side so that an operative connection for the application of vacuum pressure to the workpiece can be provided via it. The receiving chamber 36 can, as described in greater detail further on, accommodate resin in accordance with its volume and so the drawing in of resin into the suction line 28 can be avoided by the design of the vacuum port 30 as a resin trap (resin buffer).

For the pressure separation of the workpiece in relation to the surroundings a vacuum foil 38 is arranged over it, beneath which the application by vacuum pressure generated by the vacuum pump 24 is operative and leads to a drawing in of resin and thus to resin infiltration of the semifinished fiber article 12. A seal 40, for example, in the form of a sealing tape is arranged between the vacuum foil 38 and the mold 10 for the pressure sealing around the workpiece. A seal is also arranged in the area, in which the vacuum port 30 or rather the suction line 28 is guided through the vacuum foil 38. In addition, an upper side of the flange 32 is advantageously of a chamfered design so that the flange is designed in the shape of a truncated cone with a cone angle which is, for example, in the order of magnitude of 150°. The upper side of the flange 32 can then be used as a sealing surface for the vacuum foil 38.

In particular, a plurality of vacuum ports and also vacuum pumps may also be provided and these are positioned at different points in the assembly for the production of the component. One vacuum port is thereby positioned at a distance to an edge 42 of the semifinished fiber article 12 which is reached by the flow front of the liquid resin last during the resin injection. This vacuum port is, therefore, also reached resin last and the application by vacuum pressure can be exerted via this vacuum port for such a time until the resin front reaches this vacuum port.

A distribution fabric 44 is arranged around the semifinished fiber article 12 and this serves as a flow aid for the resin for the supply to the semifinished fiber article. Flow channels for the resin are formed in the distribution fabric 44 in order to distribute this areally over the semifinished fiber article 12. In addition, the distribution fabric 44 is designed such that the application of vacuum pressure to the semifinished fiber article 12 can be carried out uniformly.

For the application of vacuum pressure to the semifinished fiber article 12 for the vacuum injection of resin it is provided, in particular, for one or several vacuum ports to also be positioned on the distribution fabric 44. This is indicated in FIG. 6($b$) by means of the vacuum ports with the reference numerals 46$a$, 46$b$ whereas the vacuum ports 48$a$ and 48$b$ are positioned outside the semifinished fiber article.

If the flow front of the resin reaches those vacuum ports which are positioned on the distribution fabric accordingly, their application by vacuum pressure is switched off in order to avoid resin being drawn off from the workpiece.

A separating film 50 is arranged between the distribution fabric 44 and the semifinished fiber article 12 prior to the resin infiltration and this serves the purpose of enabling the distribution fabric 44 to be released from the workpiece more easily following the resin curing.

Furthermore, a peel ply 52 is provided which is arranged on the semifinished fiber article 12 beneath the separating film 50 (shown only partially in FIG. 1 for reasons of clarity). The peel ply 52 has the task of generating a defined workpiece surface (laminate surface) and thus of ensuring that the workpiece can be processed further after the curing of the resin. The peel ply 52 is permeable and so a resin infiltration of the semifinished fiber article 12 can take place through it. The peel ply is removed from the workpieces surface after the curing of the resin.

A stop area 54 is formed at the workpiece edge 52 as a resin brake which represents a barrier for highly liquid resin and accordingly prevents low-viscous resin, with which the semifinished fiber article 12 has been infiltrated, from running out of this again. For example, the stop area 54 comprises a single-layered peel ply with a width of, for example, 10 cm which has been placed around the workpiece edge 42. It is favorable for this purpose when, on the one hand, the stop area is sealed by means of a sealing tape 56 in relation to the vacuum foil 38 and, on the other hand, is sealed by means of a sealing tape 58 in relation to the mold 10, wherein the application of vacuum pressure to the semifinished fiber article 12 must, however, be ensured.

Furthermore, it is advantageous to keep the stop area 54 at a lower temperature than the workpiece so that the flowability of the resin at the stop area 54 is reduced.

The arrangement of vacuum ports can then be different to the extent that these are located within the stop area in relation to the semifinished fiber article 12 (vacuum ports 46a, 46b in FIG. 6(*b*)) and/or located outside the stop area 54 (vacuum port 30 in FIG. 1; vacuum ports 48a, 48b in FIG. 6(*b*)).

The pressure at the workpiece can be determined via at least one pressure sensor 60 which can be brought into operative connection with the distribution fabric 44. To absorb the pressure, a connection flange 62 with a large basic surface area is provided in order to avoid impressions on the workpiece surface and prevent any pinching of distribution fabric. The connection flange 62 is connected to the pressure sensor 60, for example, via a tube 64, wherein the tube 64 can be clamped off via a tube clamp 66. The tube clamp is preferably arranged directly above the connection flange 62 so that no resin can pass into the tube 64 and can damage the pressure sensor 60 when it clamps off the tube. It is then possible for the pressure sensor 60 to be uncoupled via the tube clamp 66 prior to the infiltration and during the infiltration of the resin at the workpiece and for the pressure measurement to be taken only after the complete injection of the resin in that the air remaining in the tube 64 is drawn off first of all via the distribution fabric 44 after opening of the clamp, namely until the pressure in the tube 64 corresponds to the pressure in the semifinished fiber article 12; the application of (under)pressure to the semifinished fiber article 12 can then be measured by means of the pressure sensor 60.

The pressure sensor 60 is connected to the control and regulation device 20 via a signal line 68 so that the measured pressure values can be transmitted to the device.

Furthermore, temperature sensors can also be arranged over the distribution fabric in a distributed manner in order to obtain corresponding temperature measurement values and pass these on to the control and regulation device 20 (not shown).

A supply device with a storage vessel 70 is provided for the supply of resin to the semifinished fiber article 12 and this can be heated, in particular, via a heating device 72 in order to be able to adjust the temperature of injected resin. The heating device 72 is connected to the control and regulation device 20 via a control line 74 for this purpose.

A supply line 76 leads from the storage vessel 70 for resin to the vacuum chamber 78 between mold 10 and vacuum foil 38. The supply line 76 is formed, in particular, by a silicone tube. Resin is supplied from the storage vessel 70 to the semifinished fiber article 12, which is, for example, a laminate, in particular in order to carry out a linear gating, preferably in a controlled manner, in that the throughflow through the supply line 76 is controlled accordingly, for example, by means of a tube clamp on this line.

In a variation of one embodiment, an on-line process control with respect to the quality of the workpiece is possible by way of action by ultrasound on the workpiece via an ultrasonic examining device 80. The sound velocity and sound attenuation in the workpiece are, in particular, determined during the production process, for example, by means of a pair of sensors in through connection. If the resin is cured, the ultrasonic attenuation is then minimal and the sound velocity is at a maximum; the degree of curing may, therefore, be ascertained via the ultrasonic process control. Furthermore, statements can also be made concerning the quality of the workpiece.

In an alternative embodiment, which is shown in FIG. 2, the vacuum port 30 is positioned on a strip 82 of distribution fabric which is again positioned on the mold 10, possibly with a separating film inserted in-between. Elements of FIG. 2, which correspond to those in FIG. 1, are designated with the same reference numerals as in this Figure. The strip 82 of distribution fabric reaches under the semifinished fiber article 12 in a broad area of, for example, 1 cm, wherein the strip 84 of distribution fabric, on which the semifinished fiber article 12 is arranged, has, in particular, one layer. A seal 88 is arranged between the vacuum foil 38 and a stop film 86, the vacuum port 30 being sealed in relation to an upper side of the semifinished fiber article 12 by means of this seal. Furthermore, a seal 90 is arranged between the stop film 86 and the strip 84 of distribution fabric in order to seal the vacuum foil 38 in relation to the semifinished fiber article 12. A strip of film 92 is provided between the seal 88 and the strip 84 of distribution fabric and this prevents the seal 88 from blocking the strip 84 of distribution fabric; the strip of film 90 therefore serves as a cover for the strip 84 of distribution fabric.

On account of this arrangement of the seals 88 and 90, the application of vacuum pressure to the semifinished fiber article 12 is brought about via the strip 84 of distribution fabric and a stop area is formed at the edge 42 of the semifinished fiber article 12. As a result of the connection of the distribution fabric 84 to the underside of the semifinished fiber article 12, wherein resin is supplied from the upper side, the vacuum port 30 can draw off air from the vacuum chamber 78 until the semifinished fiber article 12 is completely impregnated; as a result, the vacuum injection of the resin may be carried out in an effective manner.

In the embodiment shown in FIG. 2, the vacuum foil 38 is connected to the upper side of the flange 32 so as to be pressure-tight by means of an annular sealing tape 94.

In FIG. 3, the course of the resin front is shown schematically when this reaches the edge 42 of the component, wherein the distribution fabric ends flush with the edge 42 of the component. If the distribution fabric 44 extends as far as the edge 42, a flow front angle is formed in relation to the semifinished fiber article 12 when the resin front reaches the edge 42 at an upper end 98 of the semifinished fiber article 12 at a point of time 96.

Cavities and open flow channels are present at the edge 42 of the workpiece and these are caused, for example, by fabric layers which are not cut exactly or by folding of the vacuum foil 38. The resin penetrates these cavities and can infiltrate the workpiece inwards from the edge 42 and so an oppositely directed flow front 100 can be formed. Air pockets 102 can result in the workpiece due to the two flow fronts extending contrary to one another (instant 96 and instant 100) and these can have a negative effect on the quality of the component.

In accordance with the invention, air pockets, such as the air pocket 102, are avoided in that the distribution fabric 44 is made inoperative with respect to the supply of resin after a certain distance in relation to the workpiece edge 42.

In a variation of one embodiment, which is shown in FIG. 4, the distribution fabric 44 ends in front of the edge 42 so that there is a distance between an end 104 of the distribution fabric 44 and the edge 42 of the workpiece which is, in particular, in the range of between 20 mm and 30 mm. If the resin front reaches the end 104 of the distribution fabric 44 at a point of time 106, the same flow angle is formed as in FIG. 3 at the point of time 96 insofar as the additional conditions are accordingly the same. The flow front angle is, however, reduced with increasing time since the speed of the flow front is reduced as the supply of resin from above is considerably reduced between the end 104 of the distribution fabric 34 and the edge 42 of the component. With increasing time the flow front angle becomes ever steeper and, ideally, a vertical flow front 108 is formed.

The reduction in speed of the flow front is caused by the fact that the resin front runs much more slowly in the semifinished fiber article 12 than in the distribution fabric 44 and, on the other hand, more resin has to be introduced on a smaller surface area.

No oppositely directed fronts can then be formed and air pockets are avoided as a result and the semifinished fiber article 12 is infiltrated more uniformly in the vicinity of the edge 42 of the component.

FIG. 5 shows a variation, with which the distribution fabric ends flush with the edge 42 of the component. However, the edge of the component is covered with a film 110 which has, for example, a width of 50 mm. The separating film 50 and the distribution fabric extend over the film 110. The film 110 itself is impermeable for the resin. The supply of resin to the semifinished fiber article 12 is therefore blocked from above in the area of the film 110. This causes the same effect as that described on the basis of the embodiment according to FIG. 4: The speed of flow of the resin is reduced and the flow front angle is increased and, in the ideal case, a vertical flow front 108 results.

In one embodiment of an apparatus for carrying out the inventive process, a one-sided mold 112 is provided, as shown in FIG. 6(a), and this has a trough 114 so that components which have adjoining flanks can also be produced. The mold 112 is mounted on a base plate 116. It can, in particular, be heated.

A semifinished fiber article 118 is positioned in the trough 114 and a peel ply 120, a separating film 122 and a distribution fabric 124 positioned thereon. A vacuum foil (not shown in FIG. 6(a)) is arranged thereabove so as to be pressure-tight by means of a sealing tape 126 in order to form a vacuum chamber 128, by means of which resin can be injected into the semifinished fiber article 118.

Furthermore, a resin brake 130 is provided which, as already described in conjunction with the stop area 54, prevents highly fluid resin from running out.

The application by vacuum pressure via vacuum ports 46a, 46b, 48a, 48b is brought about as already described in conjunction with the vacuum port 30.

A resin storage vessel 132 is provided for the resin.

Fundamentally, there is the risk that air pockets can result during the infiltration of curved workpiece edges 134, as shown by way of example in FIG. 7 which illustrates an enlarged section of the area A of FIG. 6(a). The distribution fabric 124 forms a bend at the workpiece edge 134 in order to follow the contour of the semifinished fiber article 118. The semifinished fiber article 118 has, for example, a laminate structure 136 (layered structure). The resin front in the laminate structure 136 has reached the workpiece edge 134 at a point of time 138 and the resin front runs around the workpiece edge 134 at an unchanged speed. The supply speed of the resin from the distribution fabric 124 at right angles to the layers 140 of the laminate structure is likewise essentially constant and so an arc-shaped angular course 142 of the flow front results altogether in the area of the workpiece edge 134. As a result, there is, however, the risk of air pockets 144 being able to form in the workpiece close to a surface of the mold 112 since a flow front 146 runs further with the flow front angle in layers 148 at right angles to the layers 140 while the supply of resin to the area 144 is stopped.

In order to avoid this, the distribution fabric 124 is, in accordance with the invention, as shown in FIG. 8, cut at the workpiece edge 134 so that in this area 150 the distribution fabric 124 is not continuous but rather a gap 152 is formed between the cut ends of the distribution fabric 124 which has, for example, a width of approximately 20 mm.

The resin front has the customary flow front angle at a point of time 154 when this is far away from the workpiece edge. As a result of the fact that resin is also supplied to the laminate structure 136 via the gap 152, the resin front requires a longer time until it has passed through the workpiece edge 134. More resin must be introduced, and the resin front runs more slowly in the laminate structure 136 than in the distribution fabric 124. Due to the reduction in the flow speed, the flow front angle will become steeper and, in the ideal case, a vertical flow front is formed. After flowing around the workpiece edge 134, the normal flow front angle can again be formed at a sufficient distance. The risk of air pockets 144 resulting is greatly reduced due to the flow front becoming steeper.

In order to avoid the resin being able to flow around the workpiece edge 134 in the area thereof, a careful sealing 156 of corresponding edge ends is provided.

Heat curing resin systems are used in accordance with the invention for the infiltration of the semifinished fiber article. With these resin systems the temperature required for the curing is higher and, in particular, clearly higher than room temperature (high temperature resins). Polyaddition resins, in particular, such as epoxy resins and bismaline resins, can also be used,.

The resin system Hexcel RTM6 can be used with the inventive process and this has an operating temperature in the order of magnitude of up to approximately 180° C. The resin system Hexcel RTM6 is authorized for aviation.

Additional examples of useful resin systems are PR500 (3M) or ST1151 (SEP).

FIG. 9 shows the course of the boiling point curve 158 of RTM6. Above this curve the resin is present in the liquid state, below it it is gaseous. When the boiling point curve 158 is exceeded, gas bubbles occur in the resin which are undesired during the production of a structural component.

At temperatures above approximately 140° C. the boiling point curve rises steeply, i.e. in order to keep the resin liquid during an increase in temperature an increase in pressure is required (reduction in the application by vacuum pressure) when, for example, the underpessure in the vacuum chamber 78 and 128, respectively, is, for example, 150 hPa.

FIG. 10 shows the temperature dependence of the viscosity of Hexcel RTM6, wherein the dynamic viscosity is plotted on the ordinates in a logarithmic scale. As can be seen, the viscosity decreases considerably with increasing temperature. A reasonable operative range for the infiltration of semifinished fiber articles is with viscosities in the range of between 1000 mPas and 100 mPas, i.e. at temperatures between approximately 90° C. and approximately 120° C.

FIG. 11 shows the temperature dependence of the processing time t* of Hexcel RTM6. It is possible to pre-age RTM in that it is prereacted, for example, at a temperature of 120° C. for approximately 2 hours before an infiltration of the semifinished fiber article takes place. As a result, an increase in viscosity may be brought about due to the prereaction, wherein the processing time is, on the other hand, reduced. As a result of prereaction of the resin, a shorter gelling time may be set and the processing time adjusted accordingly.

FIG. 11 shows the processing time for prereacted resin which has, at a temperature of approximately 110° C., a viscosity of approximately 200 mPas instead of approximately 90 mPas in the case of resin not prereacted.

The inventive process functions as follows:

A mold 112 is used, for example, for the production of a composite part. A semifinished fiber article 118 is positioned in the mold in a corresponding configuration, wherein a separating film is preferably arranged between the mold and the semifinished fiber article. A peel ply 52, a separating film 50 as well as a distribution fabric 44 are then positioned above the semifinished fiber article. The distribution fabric is thereby cut at workpiece edges 134 in the manner explained in conjunction with FIGS. 7 and 8. Furthermore, the distribution fabric is positioned at the workpiece edge 42 in the manner described in conjunction with FIG. 4 or a film 110 is provided, as described in conjunction with FIG. 5.

Furthermore, the vacuum foil 38 is then arranged and sealing carried out in order to generate a vacuum chamber 128 accordingly. The application of vacuum pressure to the vacuum chamber 128 is brought about by way of one or several vacuum pumps 24 which act on the vacuum chamber 128 via vacuum ports 46a, 46b, 48a, 48b or 30.

Furthermore, stop areas 54 or resin brakes 130 are formed in order to prevent any running out of highly fluid resin from an infiltrated semifinished fiber article 12 and 118, respectively, to a great extent.

Prior to and during the resin infiltration, the pressure sensor 60, which takes up pressure via the distribution fabric 44, is uncoupled from this in that the tube clamp 66 acts on the tube 64.

A given capacity is adjusted at the vacuum pump 24 and this leads to a given application by vacuum pressure which is adjusted accordingly in a controlled manner. This controlled adjustment is brought about, in particular, via the control and regulation device 20.

The mold 112 is kept at a given temperature. The resin in the storage vessel 70 and 132, respectively, is likewise kept at a given temperature in order to ensure suppliability (flowability) to the semifinished article. Normal temperatures for Hexcel RTM6 are 90° C. to 120° C. The temperature during the resin injection is monitored via the temperature sensors 16 and/or via temperature sensors which are arranged on the distribution fabric.

The resin infiltration is monitored by the control and regulation device 20.

The supply of resin via the supply line 76 is controlled.

For example, the resin is now supplied to the semifinished fiber article 12 at a temperature of 100° C., wherein this is injected into the semifinished fiber article due to the vacuum in the vacuum chamber 78. FIG. 12 schematically shows a temperature curve 160 during the production of the component. During an injection phase 162, the temperature is kept constant for approximately 2 hours and 10 minutes essentially at 100° C. or in an alternative variation is kept constant at 120° C. The vacuum adjusted via the pumping capacity of the vacuum pump 24 is thereby such that the boiling point curve 158 of the resin system is not exceeded, i.e. that no gas bubbles can form which could otherwise no longer be removed from the workpiece. A pressure curve 164 is shown schematically for one embodiment. The required vacuum 166 is adjusted via the control and regulation device 20 by means of the pumping capacity.

The injection phase 162 is terminated in that the temperature is increased (reference numeral 168 in FIG. 12). The control and regulation device reduces the application by vacuum pressure at the same time (increases the pressure), as indicated in FIG. 12 by the reference numeral 170. As a result, it is possible to avoid the boiling point curve 158 being exceeded since the boiling point curve increases monotonically with an increase in temperature.

Furthermore, an outgassing of the resin is reduced due to the increase in pressure. In addition, the risk of the resin being drawn out of the semifinished fiber article 12 saturated with resin is reduced as a result.

The temperature of, for example, 120° C. during such a curing phase 172 which follows on from the injection phase 162 is then maintained over a given period of time of, for example, 2 hours and likewise an essentially constant application by vacuum pressure is maintained.

An additional curing phase 174, in which the final curing takes place, is then initiated by an additional increase in temperature to, for example, 120° C. In this curing phase 174 the resin is already cured so that the risk of boiling bubbles being formed and the risk of resin being drawn off no longer exist. The period of time for the final curing can be, for example, 2 hours.

During the injection phase 162, the resin is supplied to the semifinished fiber article 12 essentially by means of the distribution fabric 44 which serves as a flow aid. Flow channels are formed in the distribution fabric, wherein the flow of resin is brought about on account of the pressure gradient.

The vacuum port 30 (or 48a, 48b) is positioned so far away from the semifinished fiber article 12 and a component edge 42 that the resin does not reach it until the semifinished fiber article 12 is completely saturated with resin, i.e. a resin front has passed completely through it. A vacuum can still be applied in the vacuum chamber 78 in order to achieve a complete resin infiltration. The receiving chamber 36 can thereby accommodate resin in accordance with its volume without this being drawn into the vacuum system (suction line 28, vacuum pump 24).

A further resin trap may be formed by means of the storage vessel 70 and 132, respectively: If the storage vessel 70 is closed with a cover after infiltration of the semifinished fiber article 12, an extraction vessel may be created in this manner. The vacuum is then distributed uniformly over the entire workpiece via a gating channel, which is connected to the supply line 76, and the distribution fabric 44. If the vacuum is adjusted accordingly such that the level of resin in the supply line 76, which comprises an ascending line part, can rise as far as just beneath the storage vessel 70 as extraction vessel, a corresponding choice of the internal diameter of the supply line 76 can prevent resin from being pressed into the extraction vessel 70 and it is ensured that only air and gas bubbles can rise.

It is possible by means of the heating means 72 to ensure that following the infiltration the extraction vessel 70 has a lower temperature than the mold 12 and so the resin in the extraction vessel ultimately gels.

The tube clamp 66 is released upon termination of the infiltration phase (injection phase) 162; the air thereby remaining in the tube 64 is drawn off via the distribution fabric 44 on account of the vacuum in the vacuum chamber 78 until a balance of pressure is brought about. The pressure sensor 60 can then determine the corresponding, prevailing pressure in the vacuum chamber 78 and thus in the workpiece in order to prevent the formation of boiling bubbles in this way during an increase in temperature and/or pressure in that the pressure is controlled or regulated accordingly in order for the boiling point curve not to be exceeded.

In accordance with the invention, not only small components but also large components may be produced in the vacuum pressure without an autoclave needing to be provided, wherein very good component qualities can be achieved. At the same time, the manufacturing costs can be reduced considerably since no autoclave has to be provided. In accordance with the invention, components with large surface areas can also be produced by means of vacuum injection with resin.

What is claimed is:

1. A process for the production of a component consisting of a fiber reinforced material, wherein:
    a liquid heat curing resin is applied to a semi-finished fiber article via vacuum pressure,
    the vacuum pressure is controlled together with temperature such that during application of the liquid resin, including during resin infiltration and curing, the boiling point curve of the resin is not exceeded, and
    a distribution fabric serving as a flow aid for the supply of the resin to the semi-finished fiber article becomes inoperative at a certain distance in relation to a workpiece edge.

2. A process as defined in claim 1, wherein the application by vacuum pressure is controlled via a vacuum pump during the resin infiltration.

3. A process as defined in claim 1, wherein vacuum pressure is applied to a distribution fabric serving to supply the resin to the semi-finished fiber article.

4. A process as defined in claim 1, wherein the pressure following the resin infiltration is measured at a distribution fabric serving to supply the resin to the semi-finished fiber article.

5. A process as defined in claim 4, wherein at least one pressure sensor is brought into operative contact with the distribution fabric following the resin infiltration of the article.

6. A process as defined in claim 5, wherein the operative contact is interrupted prior to and during the resin infiltration of the article.

7. A process as defined in claim 1, wherein the semi-finished fiber article is placed in a mold during the resin infiltration.

8. A process as defined in claim 7, wherein the temperature of the mold is controlled.

9. A process as defined in claim 1, wherein a plurality of temperature sensors are arranged at a vacuum foil.

10. A process as defined in claim 1, wherein the temperature is adjusted with respect to a temperature dependence of the viscosity of the resin.

11. A process as defined in claim 10, wherein the resin infiltration takes place in an injection phase at a certain temperature or in a certain range of temperatures, the resin thereby having such a viscosity that an essentially uniform resin front is formable.

12. A process as defined in claim 10, wherein the temperature is adjusted such that the viscosity of the resin is in a range of about 10 mPas to 1000 mPas.

13. A process as defined in claim 1, wherein a reduction in the application by vacuum pressure is brought about in a curing phase following an injection phase.

14. A process as defined in claim 13, wherein an increase in temperature is brought about in the curing phase following the injection phase.

15. A process as defined in claim 1, wherein the temperature is increased in a curing phase, the resin being completely cured during said phase.

16. A process as defined in claim 15, wherein the temperature is increased in relation to an injection phase.

17. A process as defined in claim 15, wherein the temperature is increased in relation to a curing phase following an injection phase.

18. A process as defined in claim 1, wherein the temperature is adjusted such that a certain processing period or a certain processing period range is specified for the resin.

19. A process as defined in claim 18, wherein the temperature is adjusted such that the processing period of the resin is adapted to a workpiece size.

20. A process as defined in claim 1, wherein a process monitoring is carried out with respect to the resin infiltration and the resin curing.

21. A process as defined in claim 1, wherein the resin is pre-aged prior to the infiltration to increase the viscosity.

22. A process as defined in claim 1, wherein:
    a resin trap is provided for making a uniform application by vacuum pressure possible after the resin infiltration, and
    any removal of the resin by suction during a curing phase of the resin is essentially prevented.

23. A process as defined in claim 22, wherein the resin trap comprises an extraction guide means having such a large internal diameter that air and gas bubbles are able to rise without resin being pressed into an extraction chamber.

24. A process as defined in claim 22, wherein the extraction guide means is formed in a resin storage vessel for the resin injection.

25. A process as defined in claim 1, wherein the distance is in a range from about 10 mm to 50 mm.

26. A process as defined in claim 1, wherein the distribution fabric ends prior to said distance.

27. A process as defined in claim 1, wherein a cover film is provided between a workpiece and a distribution film for limiting the effectiveness of the distribution fabric.

28. A process for the production of a component consisting of a fiber reinforced material, wherein:
    a liquid heat curing resin is applied to a semi-finished fiber article via vacuum pressure,
    the vacuum pressure is controlled together with temperature such that during application of the liquid resin, including during resin infiltration and curing, the boiling point curve of the resin is not exceeded; and a distribution fabric serving as a flow aid during the supply of resin is cut in relation to a workpiece edge forming a gap in the distribution fabric in order to control an angular course of a flow front of the resin.

29. A process as defined in claim 28, wherein an end of said workpiece edge is sealed.

30. A process as defined in claim 1, wherein at least one vacuum port is provided, vacuum pressure being applied to a workpiece via said port or ports and said port or ports being connected to at least one vacuum pump.

31. A process as defined in claim 30, wherein one vacuum port is arranged in an area last reached by a flow front of injected resin.

32. A process as defined in claim 30, wherein one vacuum port is designed as a resin trap able to accommodate an amount of resin necessary to prevent the resin from passing into a vacuum system.

33. A process for the production of a component consisting of a fiber reinforced material, wherein:

a liquid heat curing resin is applied to a semi-finished fiber article via vacuum pressure, the vacuum pressure is controlled together with temperature such that during application of the liquid resin, including during resin infiltration and curing, the boiling point curve of the resin is not exceeded;

at least one vacuum port is provided, vacuum pressure being applied to a workpiece via said port or ports and said port or ports being connected to at least one vacuum pump;

one vacuum port is arranged in an area last reached by a flow front of injected resin; and said vacuum port is positioned over a distribution fabric and connected via the distribution fabric to an underside of the semi-finished fiber article.

34. A process as defined in claim 30, wherein a connection of the vacuum port to a vacuum foil is sealed.

35. A process as defined in claim 33, wherein the distribution fabric is sealed in relation to a workpiece edge.

36. A process as defined in claim 35, wherein the distribution fabric is sealed by a seal, and a film is arranged between the distribution fabric and the seal.

37. A process as defined in claim 30, wherein the vacuum port is sealed in relation to the workpiece.

38. A process as defined in claim 1, wherein a resin brake is arranged at a workpiece edge.

39. A process as defined in claim 38, wherein a first connection for the application by vacuum pressure is arranged in front of the resin brake in relation to the semi-finished fiber article and a second connection is arranged behind the resin brake.

40. A process as defined in claim 1, wherein a process monitoring is carried out by means of ultrasound acting on the workpiece.

41. A process as defined in claim 1, wherein a polyaddition resin is used as said heat curing resin.

42. A process as defined in claim 1, wherein the flow rate of the resin from a resin store to the semi-finished fiber article is controllable.

* * * * *